United States Patent
Goudey et al.

(10) Patent No.: US 10,653,119 B2
(45) Date of Patent: May 19, 2020

(54) DEVICE FOR INVERTING FLOATING OYSTER CAGES

(71) Applicants: Clifford A. Goudey, Newburyport, MA (US); William H. Mook, Newcastle, ME (US)

(72) Inventors: Clifford A. Goudey, Newburyport, MA (US); William H. Mook, Newcastle, ME (US)

( * ) Notice: Subject to any disclaimer, the term of this patent is extended or adjusted under 35 U.S.C. 154(b) by 406 days.

(21) Appl. No.: 15/470,823

(22) Filed: Mar. 27, 2017

(65) Prior Publication Data
US 2018/0213752 A1   Aug. 2, 2018

Related U.S. Application Data

(63) Continuation-in-part of application No. 62/314,325, filed on Mar. 28, 2016.

(51) Int. Cl.
*A01K 61/55* (2017.01)
*A01K 61/60* (2017.01)

(52) U.S. Cl.
CPC .............. *A01K 61/60* (2017.01); *A01K 61/55* (2017.01); *Y02A 40/822* (2018.01); *Y02A 40/826* (2018.01)

(58) Field of Classification Search
CPC ........ A01K 61/54; A01K 61/55; A01K 61/60; A01K 61/65

USPC .................................................. 119/239, 240
See application file for complete search history.

(56) References Cited

U.S. PATENT DOCUMENTS

| | | | | |
|---|---|---|---|---|
| 4,704,990 A | * | 11/1987 | Moxham | A01K 61/54 119/239 |
| 2011/0265730 A1 | * | 11/2011 | Farrington | A01K 61/54 119/239 |
| 2014/0083365 A1 | * | 3/2014 | McShane | A01K 80/00 119/234 |

FOREIGN PATENT DOCUMENTS

| | | | |
|---|---|---|---|
| FR | 2719446 | * | 11/1995 |
| FR | 2900027 | * | 10/2007 |
| JP | 2012-29643 | * | 2/2012 |
| WO | WO 2019/046935 | * | 3/2019 |

* cited by examiner

*Primary Examiner* — David J Parsley
(74) *Attorney, Agent, or Firm* — Law Offices of Ira D. Blecker, P.C.

(57) ABSTRACT

The present invention solves the problem of flipping floating oyster cages by using a rotating system that lifts one side of the oyster cage while depressing the other side. The resulting rotation torque is able to invert the oyster cage to allow the cage and the oysters to temporarily dry out as a way of controlling marine biofouling. The invention may be mounted on a boat or between two boats and can sequentially flip the oyster cages along an anchored string.

19 Claims, 10 Drawing Sheets

PRIOR ART

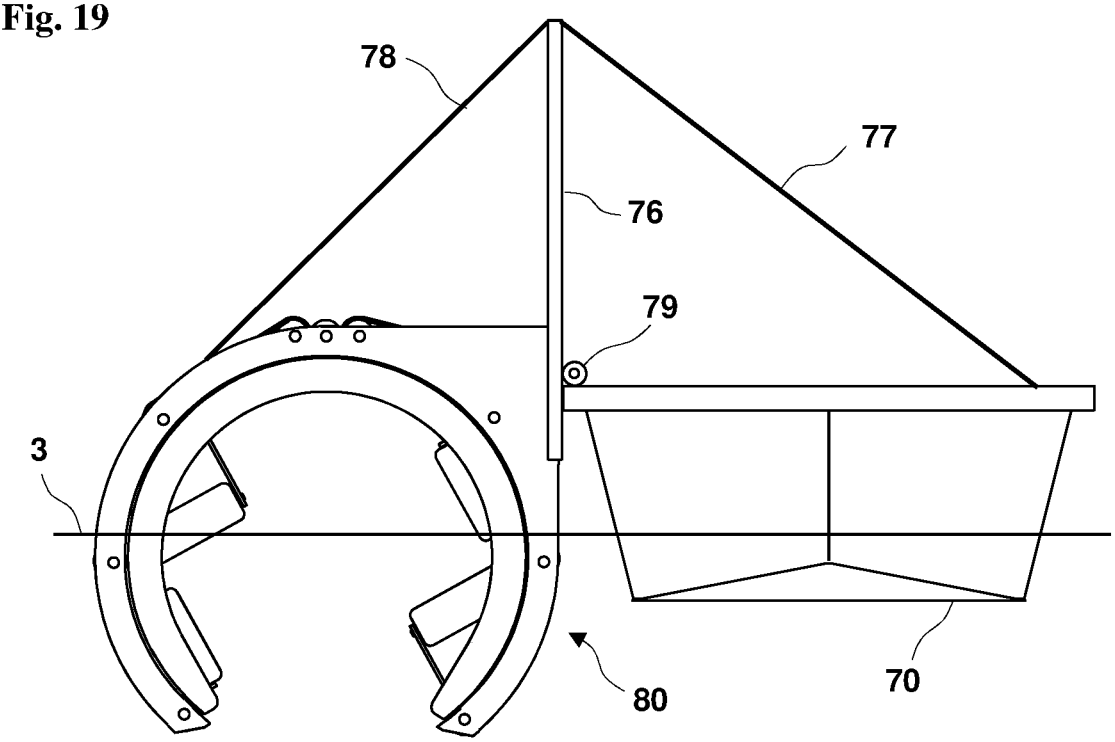

DEVICE FOR INVERTING FLOATING OYSTER CAGES

TECHNICAL FIELD

The present invention relates to shellfish farming and the servicing of floating oyster culture cages and more particularly, relates to a device that mechanizes the process of inverting oyster cages to control biofouling.

BACKGROUND OF THE INVENTION

A common method of growing oysters is to place them in cages that are suspended under floats, thereby positioning the growing oyster close to the surface of the water where optimal growing conditions exist. This method protects the oysters from predation and keeps them well above the seabed reducing the amount of suspended sediments in the water being taken up by the filter-feeding oysters and increasing the amount of plankton and other nutrients available to the oysters. Positioning the oysters close to the surface also tends to increase the water flow passing through the culture cage as well as the water temperature, both factors increasing oyster growth rates and therefore reducing the time required to bring an oyster to market size.

Regardless of the position of the culture cage in the water column, the accumulation of biofouling on the cage and on the oysters themselves can reduce water flow, increase the drag of the cage, and result in oysters that require more cleaning after they are harvested. Biofouling or biological fouling is the accumulation of microorganisms, plants, algae, or animals on wetted surfaces. However, if the culture cage is suspended under a float or floats of sufficient size, the cage and float assembly can be inverted, positioning the cage and the oysters inside the cage out of the water and subjecting them to drying from the action of sun and wind. This drying tends to kill the fouling organisms but has little effect on the oysters, a species that is able to tolerate the process.

By controlling the amount of time the cage is inverted, the biofouling can be reduced or eliminated and the health and growth rate of the oysters can be improved. Typically, an oyster cage is inverted for one day and then returned to its normal position the day after. Twenty-four hours of exposure to air-drying seems to be sufficient to kill most fouling organisms. Typically, this process, called flipping, must be done about every two weeks to be effective. The timing of this flipping will vary with oyster farm location, time of year, weather, water temperature, and knowledge of the local presence of fouling organisms.

This flipping process is generally labor intensive, being done manually by crew working from boats. The cages, particularly when they are full of mature oysters are heavy and often require two strong persons to lift one side of the cage, rotate it, and ensure the cage ends up in the desired position. A common means of doing this it to have a submerged work platform suspended over the side of a boat, resulting in the cage being at a convenient height with respect to the arms of the flipping crew.

BRIEF SUMMARY OF THE INVENTION

The various advantages and purposes of the exemplary embodiments as described hereafter are achieved by providing, according to an aspect of the exemplary embodiments, an apparatus for flipping a floating oyster cage comprising: a fixed ring; a rotatable ring rotatable concentric with the fixed ring; a means of rotating the rotatable ring relative to and concentric with the fixed ring; and a plurality of supports fixed on an interior surface of the rotatable ring such that one support extends at a first angle to the interior surface and a second support extends at the same first angle to the interior surface and the one support is spaced 180 degrees from the second support along a circumference of the rotatable ring on the interior surface, the plurality of supports receive and support the floating oyster cage; wherein, in operation, the rotatable ring rotating with respect to the fixed ring to cause the supported floating oyster cage to rotate to an inverted position as the rotating ring rotates.

According to another aspect of the exemplary embodiments, there is provided an apparatus for flipping a floating oyster cage comprising: a boat; a support structure mounted on the boat; and a mechanical flipping device attached to the support structure. The mechanical flipping device comprising: a fixed ring; a rotatable ring rotatable concentric with the fixed ring; a means of rotating the rotatable ring relative to and concentric with the fixed ring; and a plurality of supports fixed on an interior surface of the rotatable ring such that one support extends at a first angle to the interior surface and a second support extends at the same first angle to the interior surface and the one support is spaced 180 degrees from the second support along a circumference of the rotatable ring on the interior surface, the plurality of supports receive and support the floating oyster cage; wherein, in operation, the rotatable ring rotating with respect to the fixed ring to cause the supported floating oyster cage to rotate to an inverted position as the rotating ring rotates.

According to a further aspect of the exemplary embodiments, there is provided a method of flipping a floating oyster cage comprising: engaging the oyster cage with an apparatus comprising a fixed ring, a rotatable ring rotatable concentric with the fixed ring, a means of rotating the rotatable ring relative to and concentric with the fixed ring and a plurality of supports fixed on an interior surface of the rotatable ring such at least one support contacting and providing support within the rotatable ring for the oyster cage; rotating the rotatable ring to cause the rotatable ring to rotate concentric with the fixed ring, the at least one support supporting the oyster cage rotating with the rotatable ring to cause the supported floating oyster cage to rotate with the rotating of the rotatable ring; and continuing rotating the rotatable ring until the oyster cage is in an inverted position.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description that follows, taken in conjunction with the accompanying drawings in which:

FIG. 19 represents a mechanical flipping device of any of the exemplary embodiments supported by one boat.

DETAILED DESCRIPTION OF THE INVENTION

Present methods of flipping floating oyster cages are demanding and very labor intensive. The force and time required to flip such a cage can be substantial and an alternative to the laborious task of manual flipping is much sought after. The present invention relates to a system and method for mechanizing the process of inverting floating oyster culture cages, greatly reducing the labor involved in controlling biofouling growth on the cages and on the oysters being cultured inside the cages.

Figure 1:
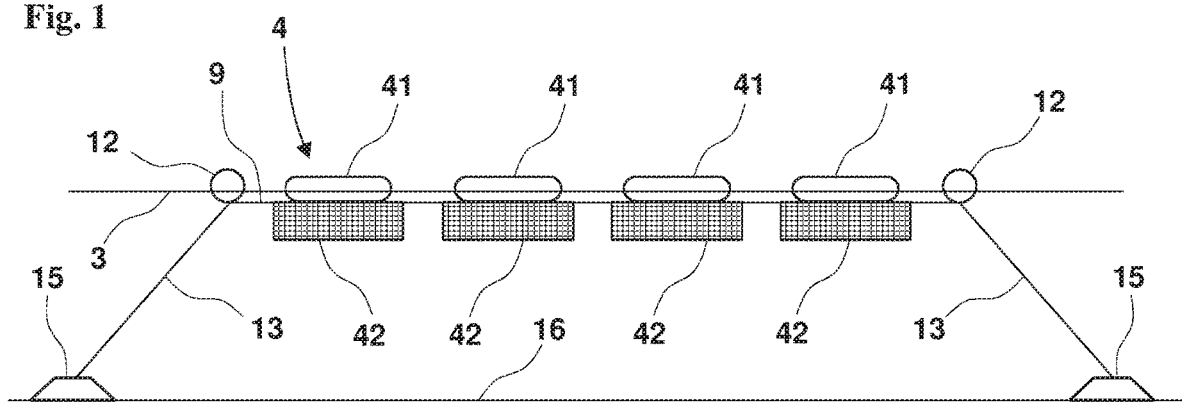
FIG. 1 represents a string of floating oyster cages anchored at both ends.

Referring to the figures in more detail, and particularly referring to FIG. 1, there is shown a string of oyster cages (4) floating relative to the surface of the water (3) such that the oysters in the cages (4) may be submerged. Each of the oyster cages (4) may be supported by elongated pontoons (41) and may have a wire mesh portion (42) for containing the oysters. These cages (4) may be connected together by a line (9) that runs between two floats (12). Each float (12) may be connected to an anchor (15) resting on the seabed (16) by an anchor line (13). The length of the line (9) and the anchor lines (13) may be such that the system may be held taut and the cages (4) may be aligned in a straight line.

In FIG. 1 the oyster cages (4) may be floating in a position beneath the surface of the water (3) such that the contained oysters are immersed and able to feed on plankton and other nutrients in the water. However, like most things placed in seawater, there may be encrusting organisms that may attach to immersed surfaces and in the case of oyster farming, the encrusting organisms may attach to the oyster shells. The encrusting organisms may both reduce the oyster's access to water flow and reduce the value of the oyster due to the encrustations on its shell.

Figure 2:
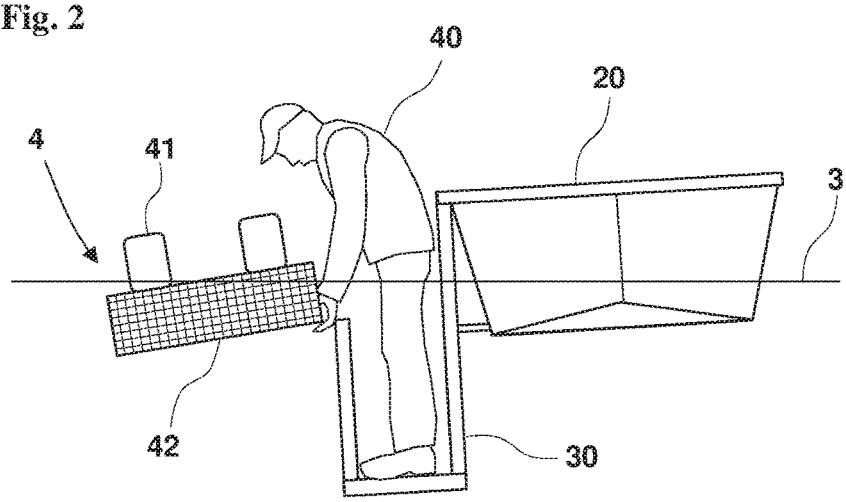
FIG. 2 represents the conventional methods of manually flipping a floating oyster cage.

Referring now to FIG. 2, there is shown the conventional method of controlling the encrusting organisms by manually flipping the floating oyster cages (4). In this approach, a boat (20) may be fitted with a submerged platform (30) where an oyster farm worker (40) may stand. The boat (20) may be maneuvered alongside floating oyster cage (4) and the worker (40) may grab the near side of the oyster cage (4) and lifts. The lifting may continue until the oyster cage (4) rolls to beyond 90 degrees when it then continues to an inverted position. In the inverted position the wire-mesh portion (42) of the oyster cage (4) may be on top of the pair of elongated pontoons (41). In that inverted position the wire-mesh portion (42) of the cage (4) may be completely above the surface of the water (3) and fouling organisms may dry out in the air and the sun and die. The oysters, used to occasions when they are out of water, are fine with this procedure.

After a period of time that depends on the temperature, wind, and sun intensity, the oyster cage (4) may be inverted again, returning the wire-mesh portion (42) of the cage (4) to its normal position below the surface of the water (3) and oyster feeding may continue. This manual method of cage flipping is laborious, slow, exhausting, weather dependent, and potentially dangerous to farm personnel.

The various advantages and purposes of the present invention in solving the problems described above and hereafter are achieved by a mechanized device that may encircle a floating oyster cage and by applying a downward force on one side of the cage and an upward force on the other side of the cage, may impart a sufficient torque on the cage over a sufficient range of rotation to result in its being inverted 180 degrees.

The mechanized device may be powered by an electric or a hydraulic motor that drives a mechanism that may impart torque on the floating oyster cage.

Further, the mechanized device may be attached to the side of a boat or positioned between the hulls of a catamaran to allow its movement along a string of floating oyster cages for the purpose of flipping them.

The mechanized device may perform the task of flipping floating oyster cages without the need to disconnect them from their normal means of being anchored in position.

Figure 3:
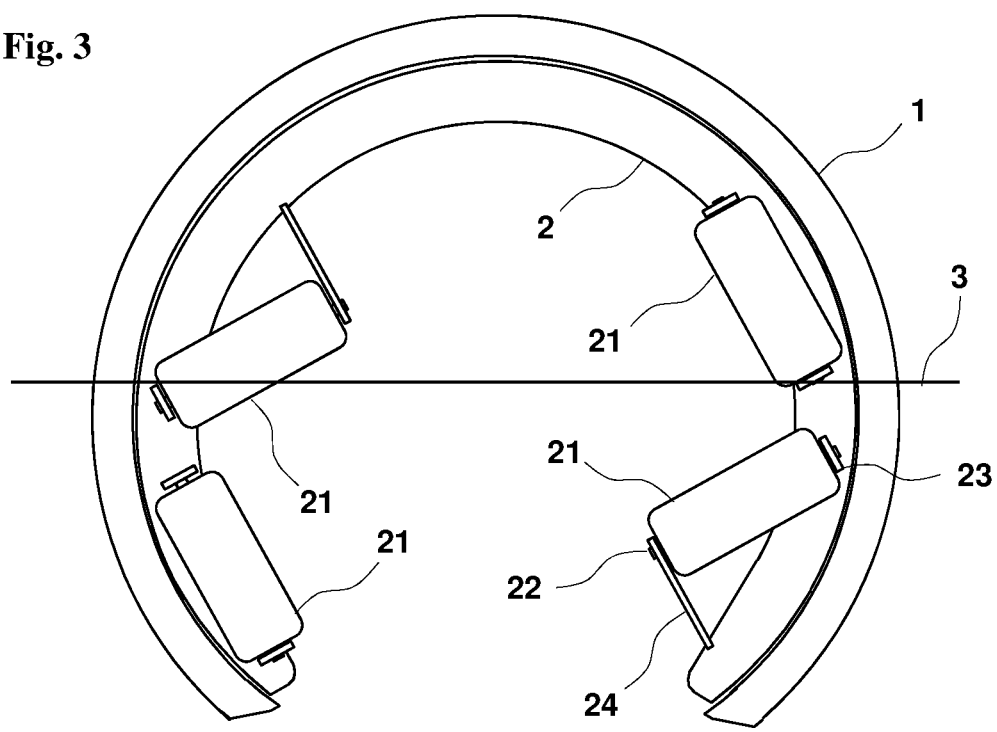
FIG. 3 represents an exemplary embodiment of a mechanical flipping device designed to capture a floating oyster cage.

Referring now to FIG. 3, there is shown a mechanical flipping device designed to accomplish the task of oyster cage flipping without requiring a worker to be standing in the water doing the repetitive, high-force motions required by the method shown in FIG. 2.

The mechanical flipping device may be composed of two parts: the fixed ring (1) and the rotating ring (2) concentric with the fixed ring (1) and in one exemplary embodiment may be concentric within the fixed ring (1). The fixed ring (1) may be fixed to a boat or other suitable apparatus while the rotating ring (2) may be able to rotate within the outer fixed ring (1). These rings (1 and 2) may be full rings or may have a gap and may be made of any suitable material including steel, stainless steel, aluminum, plastic, or composite materials.

Attached to the rotating ring (2) may be four rollers (21). The rollers (21) may be made of any suitable material such as metal, plastic, rubber, or foam. A preferred choice for these rollers (21) may be an inflatable Polyform HTM-series boat fender that may have a hole through the middle and may be easily be mounted on a shaft (22). Being resilient, a roller of this type is gentler on the oyster cage (4) during engagement.

The rollers (21) that are mounted on shafts (22) may be supported by supports (23 and 24). Depending on the orientation of the roller (21) it may be supported by short supports (23) or long supports (24). These supports (23 and 24) may be made of any suitable material including steel, stainless steel, aluminum, plastic, or composite materials. In operation, the rings (1 and 2) may be positioned to be partially below the surface of the water (3). In the position presented in FIG. 3, the gap of the fixed ring (1) and gap of the rotating ring (2) may coincide and the entire assembly may be poised to run over the top of the cages (4) and line (9) described in FIG. 1. The rotating ring (2) may be rotated by a motor or similar device (not shown).

Figure 4:
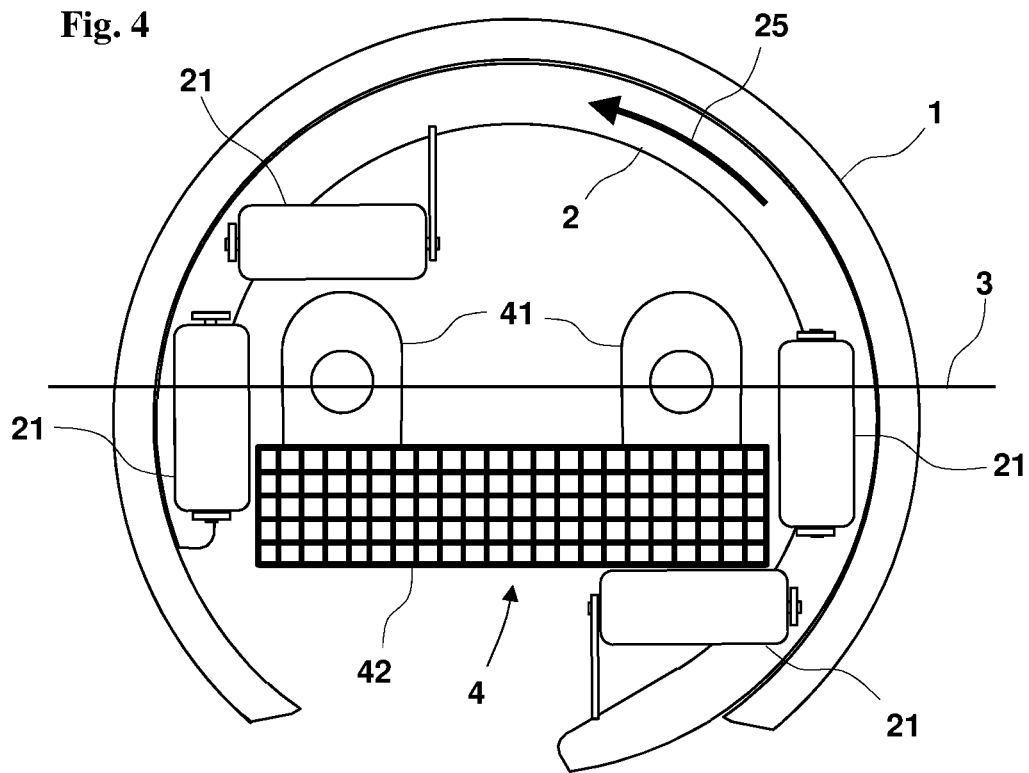
FIG. 4 represents the mechanical flipping device poised to flip a captured floating oyster cage.

Referring now to FIG. 4 there is shown the mechanical flipping device described in FIG. 3 with the rotating ring (2) oriented to capture an oyster cage (4) floating largely below the surface of the water (3) in preparation for the flipping operation. In FIG. 4, the rotating ring (2) may be oriented to bring the rollers (21) into position to coincide with the dimensions and rectangular shape of the cage (4).

Also shown in FIG. 4 is an arrow (25) indicating the direction of rotation of the rotating ring (2) in order to begin the flipping process.

Figure 5:
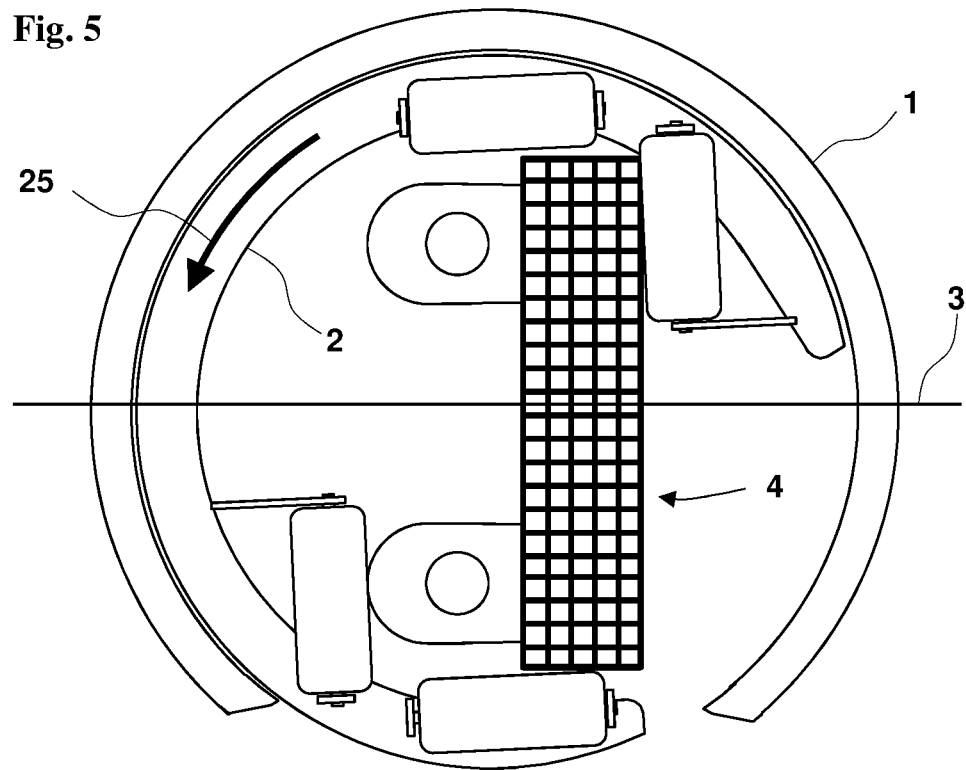
FIG. 5 represents the mechanical flipping device having partially flipped a floating oyster cage.

Referring now to FIG. 5 there is shown the mechanical flipping device described in FIG. 3 with the rotating ring (2) and the captured floating oyster cage (4) partially rotated in the direction of arrow 25. During the process, the fixed ring (1) may remain stationary with respect to the surface of the water (3) while the rotating ring (2) rotates.

Figure 6:
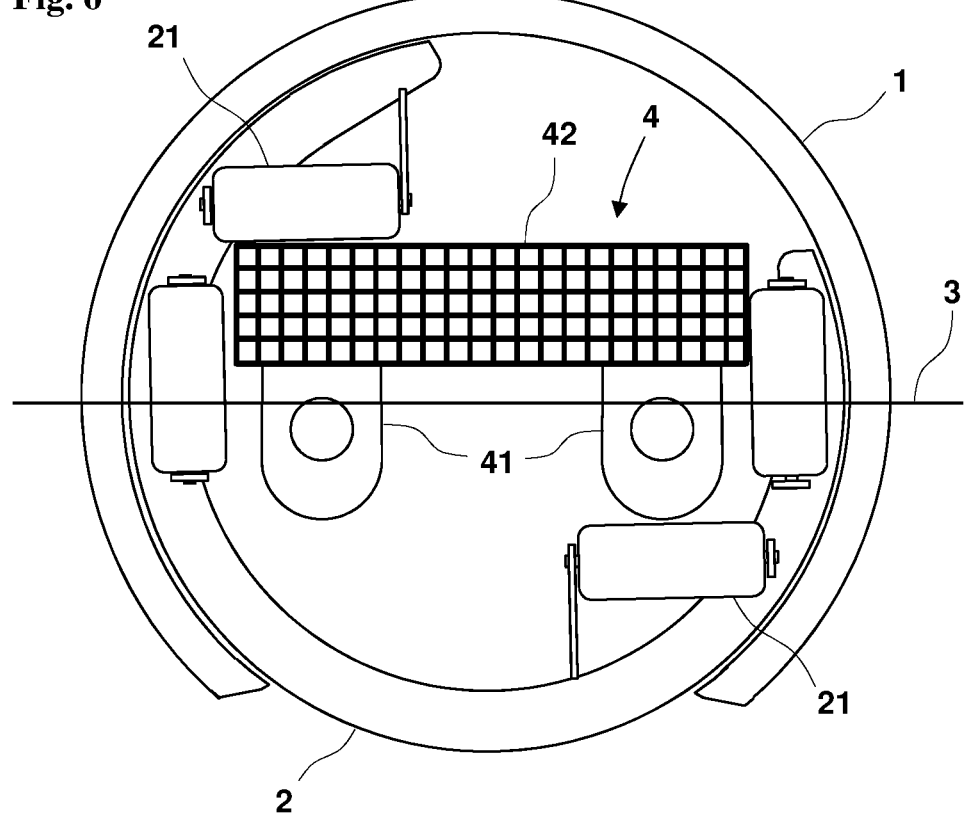
FIG. 6 represents the mechanical flipping device having flipped a floating oyster cage.

Referring now to FIG. 6 there is shown the mechanical flipping device described in FIG. 3 with the rotating ring (2) and the captured floating oyster cage (4) fully inverted, having completed a 180-degree rotation and the oyster cage (4) is now floating with its wire-mesh portion (42) supported above the surface of the water (3) on top of the pair of elongated pontoons (41). In this position marine growth that has accumulated on the oyster cage (4) may dry out due to exposure to the air and the sun. The mechanical flipping device may move away from the oyster cage (4) in its fully inverted position and traverse to another oyster cage (4).

Figure 7:
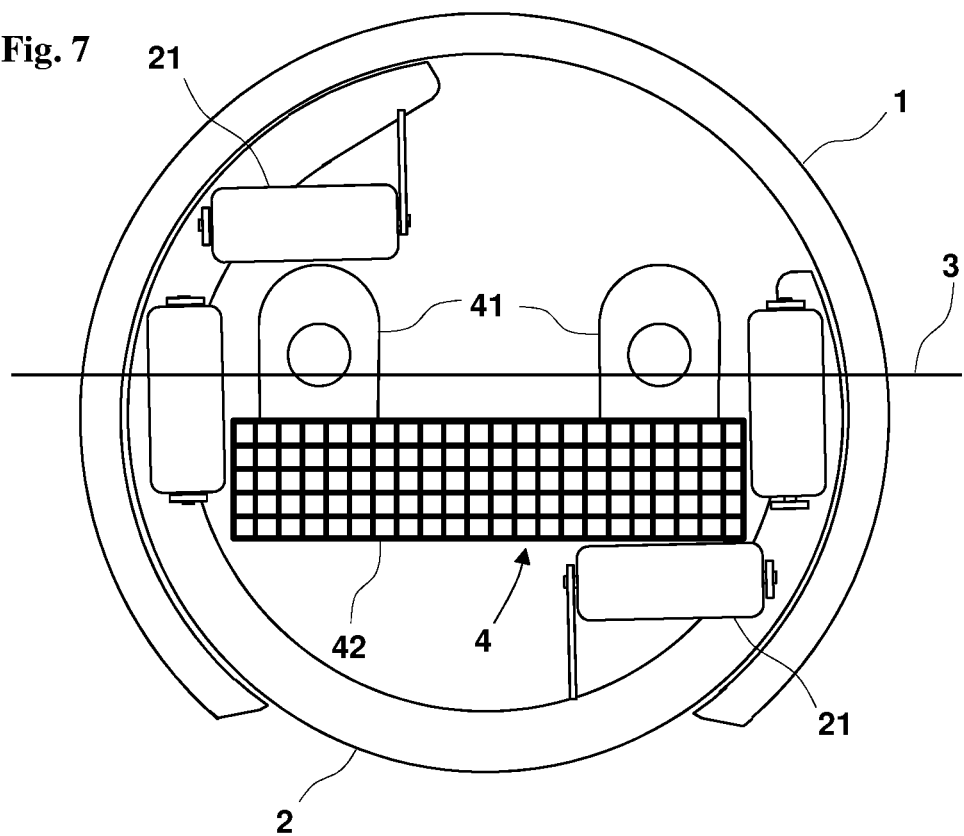
FIG. 7 represents the mechanical flipping device poised to flip another floating oyster cage.

Referring now to FIG. 7 there is shown the mechanical flipping device described in FIG. 3 with the rotating ring (2) in the same position with respect to the fixed ring (1) and the surface of the water (3) that was shown in FIG. 6, but with another floating oyster cage (4) with its wire-mesh portion (42) still below the surface of the water (3) and under the pair of elongated pontoons (41). FIG. 7 demonstrates a feature of the mechanical flipping device described in FIG. 3 whereby the rotating ring (2) and the rollers (21) it supports may be arranged symmetrically and no repositioning of the rotating ring (2) (such as shown in FIG. 4) may be required after the flipping of one oyster cage (4) before proceeding on to the next oyster cage (4). In operation this flipping process may proceed sequentially from one oyster cage (4) to another oyster cage (4) along the anchored array of cages.

Figure 8:
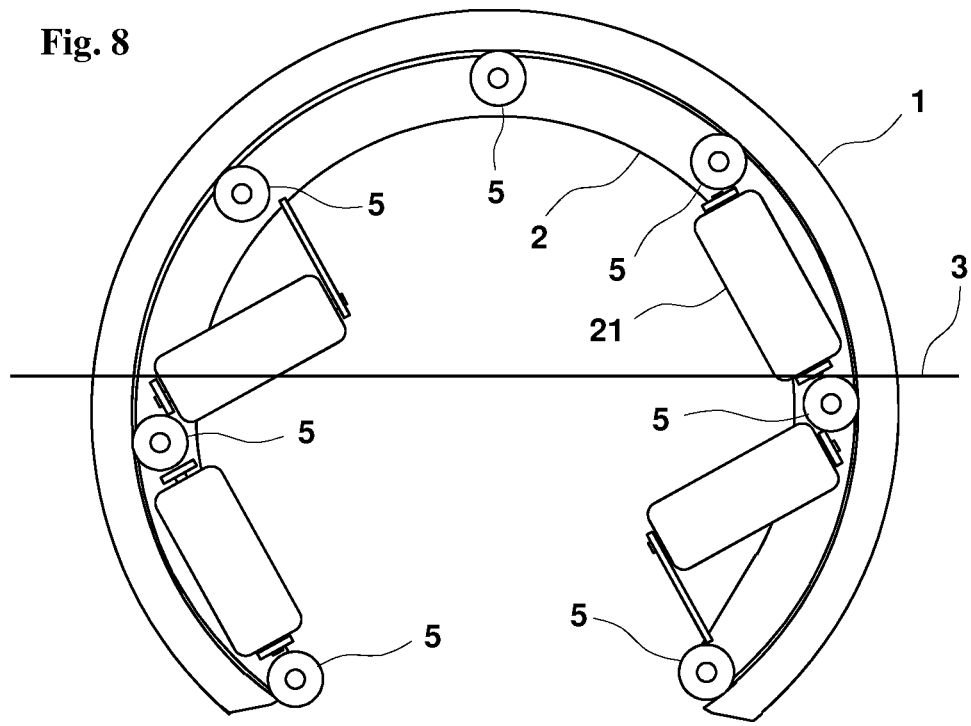
FIG. 8 represents a means of supporting the inner ring of the mechanical flipping device.

Referring now to FIG. 8, in another exemplary embodiment, there is shown the mechanical flipping device described in FIG. 3 revealing a means of supporting the rotating ring (2) within and concentric with the fixed ring (1) through the use of a number of guide rollers (5). In this exemplary embodiment the guide rollers (5) may be attached to the rotating ring (2) and roll along the interior circumference of the fixed ring (1). The number of guide rollers (5) used may vary but in order to adequately support the rotating ring (2) during all degrees of rotation, that number preferably should be at least six if they are equally spaced around the rotating ring (2). More specifically, the spacing between any two guide rollers (5) preferably should be smaller than the gap seen in fixed ring (1), which gap preferably should be less than one fifth of the circumference of fixed ring (1) to insure that the rotating ring (2) does not become dislodged when, during rotation, one of the guide rollers (5) is within that gap and is no longer supported by the fixed ring (1).

Figure 9:
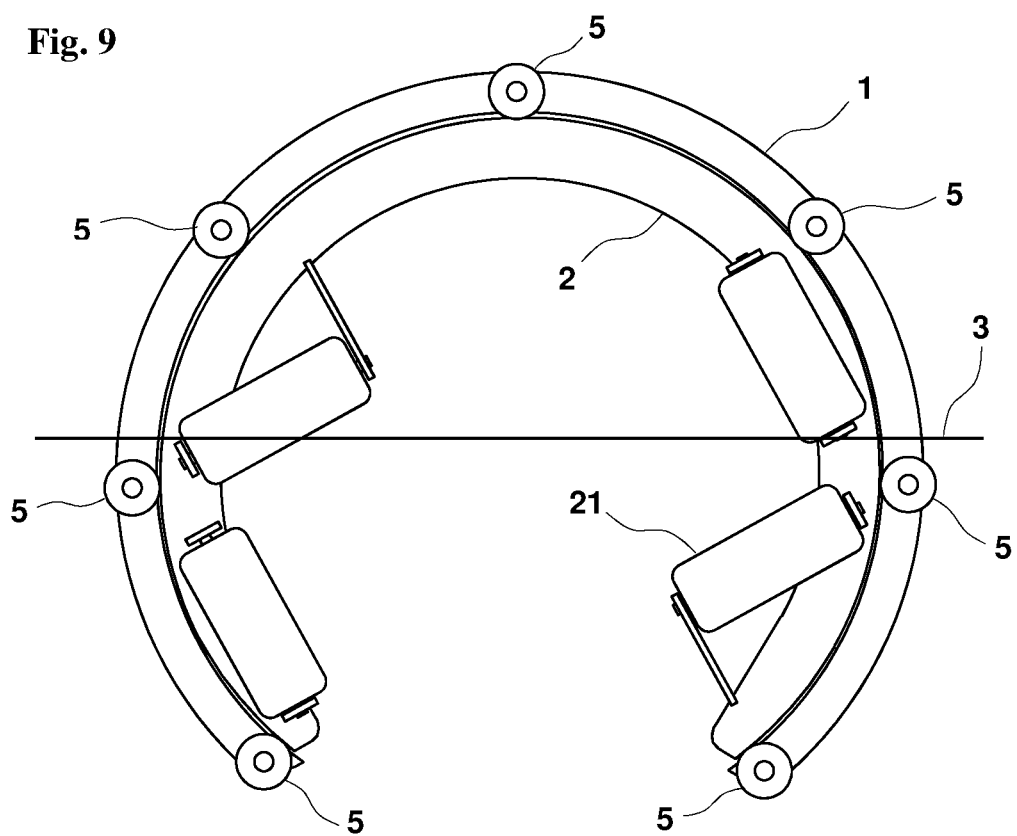
FIG. 9 represents another alternate means of supporting the inner ring of the mechanical flipping device.

Referring now to FIG. 9 there is shown the mechanical flipping device described in FIG. 3 revealing an alternate exemplary embodiment of supporting the rotating ring (2) within and concentric with the fixed ring (1). In this exemplary embodiment guide rollers (5) may be used as in FIG. 8, except the guide rollers (5) may be mounted on the fixed ring (1) and the rotating ring (2) rotates with its exterior circumference in contact with the guide rollers (5). The number of guide rollers (5) used may vary but in order to adequately support the rotating ring (2) during all degrees of rotation, that number preferably should be at least six if they are equally spaced around the rotating ring (2). More specifically, the spacing between any two guide rollers (5) preferably should be smaller than the gap seen in rotating ring (2), which gap preferably should be less that one fifth of the circumference of rotating ring (2) to insure that the rotating ring (2) does not become dislodged when, during rotation, due to the gap of rotating ring (2), rotating ring (2) is no longer supported by the guide rollers (5) closest to the gap in the fixed ring (1).

Figure 10:
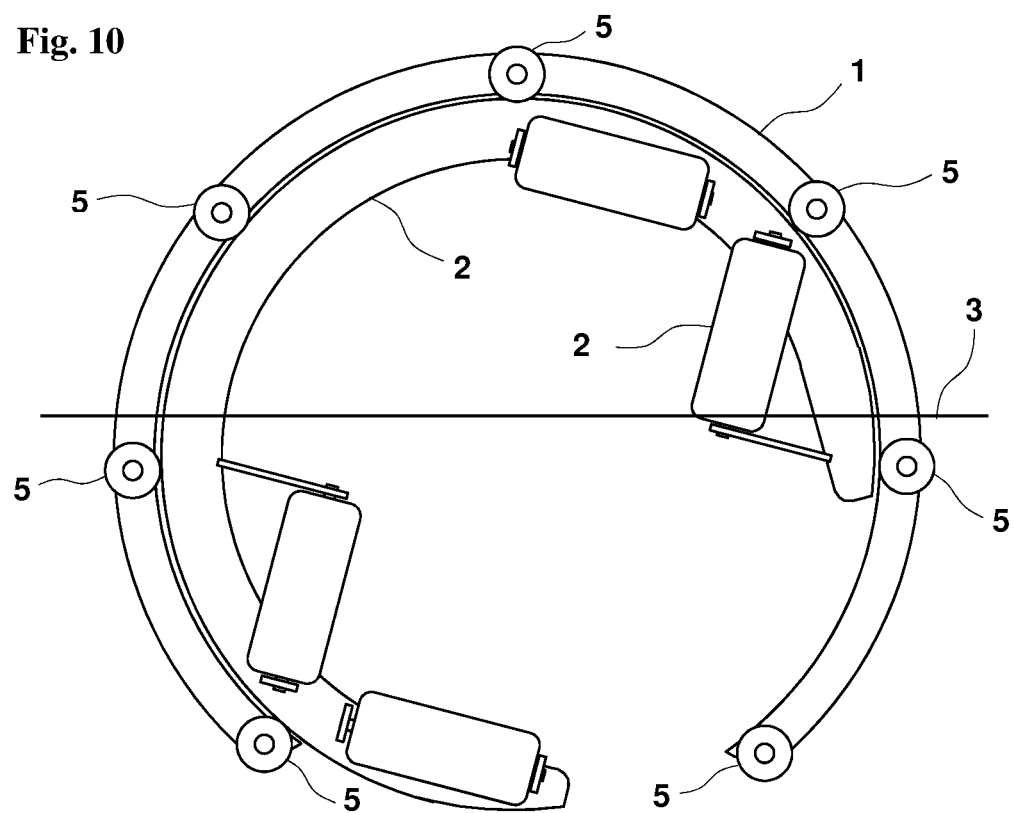
FIG. 10 represents the mechanical flipping device with the inner ring partially rotated.

Referring now to FIG. 10 there is shown the mechanical flipping device described in FIG. 9 with rotating ring (2) rotated to a position where it has lost contact with one of the guide rollers (5). In this case, due to the number of and placement of the guide rollers (5), the rotating ring (2) is still supported by a sufficient number of guide rollers (5) such that it remains concentric with the fixed ring (1).

Figure 11:
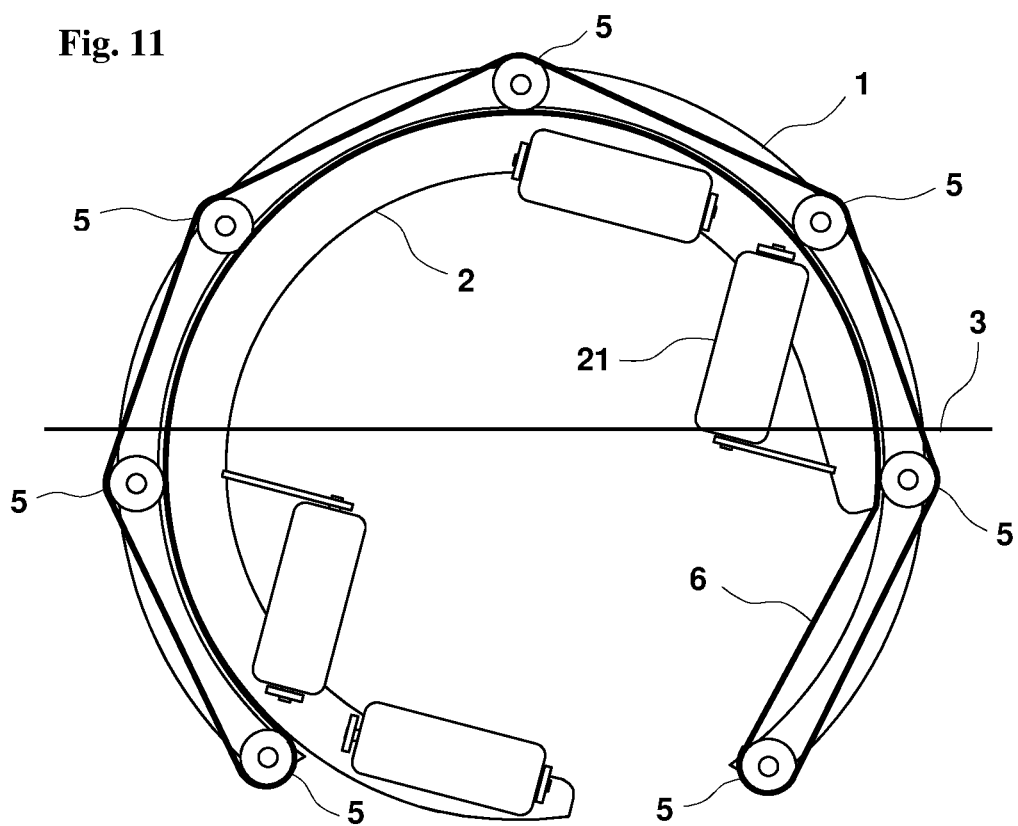
FIG. 11 represents another exemplary embodiment of a mechanical flipping device having an endless belt as a means of actuating the flipping motion.

Referring now to FIG. 11, in another exemplary embodiment, there is shown the mechanical flipping device described in FIG. 9 with the desired rotation of rotating ring (2) enabled by an endless belt (6) that passes around the guide rollers (5) and around the outer perimeter of the rotating ring (2). The endless belt (6) may be driven by motorizing one or more of the guide rollers (5). In FIG. 11 it may be seen that the gap between the ends of the rotating ring (2) may not be aligned with the gap of the fixed ring (1). As a result, the required length of endless belt (6) is shortened since it may take a shorter chord path rather than staying at a constant radius along the perimeter of the rotating ring (2).

Figure 12:
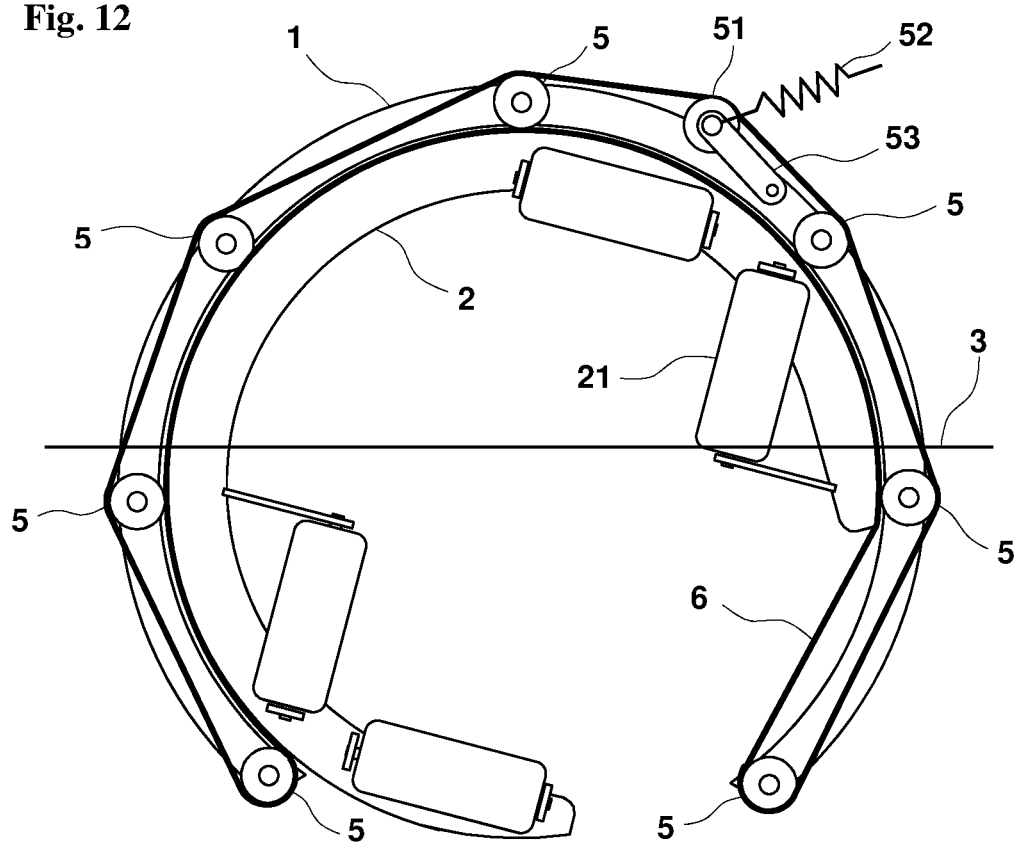
FIG. 12 represents a means of tensioning the endless belt of FIG. 11.

Referring now to FIG. 12, in another exemplary embodiment, there is shown the mechanical flipping device described in FIG. 11 with a tensioner roller (51) added to accommodate the varying length of the endless belt (6) as the rotating ring (2) rotates with respect to the fixed ring (1). The tensioner roller (51) may pivot on an arm (53) that is biased by a spring (52) such that the tensioner roller (51) may maintain tension in the endless belt (6). The tensioner roller (51) may be located between any two adjoining guide rollers (5) and could be biased either inward or outward to perform its tensioning role.

Figure 13:
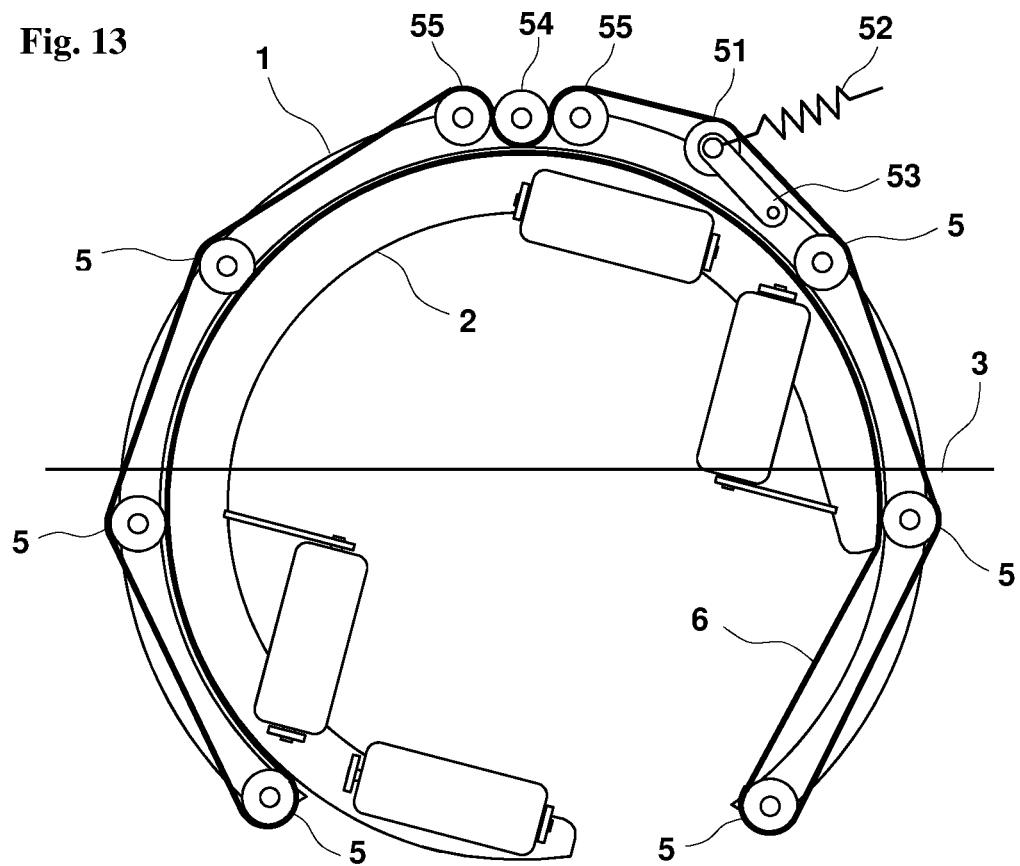
FIG. 13 represents a means of driving the endless belt of FIG. 11 with multiple drive rollers.

Referring now to FIG. 13, in another exemplary embodiment, there is shown the mechanical flipping device described in FIG. 12 with additional idler rollers (55) positioned beside one of the guide rollers (54) in order to provide more contact to better facilitate the driving of the endless belt (6).

Figure 14:
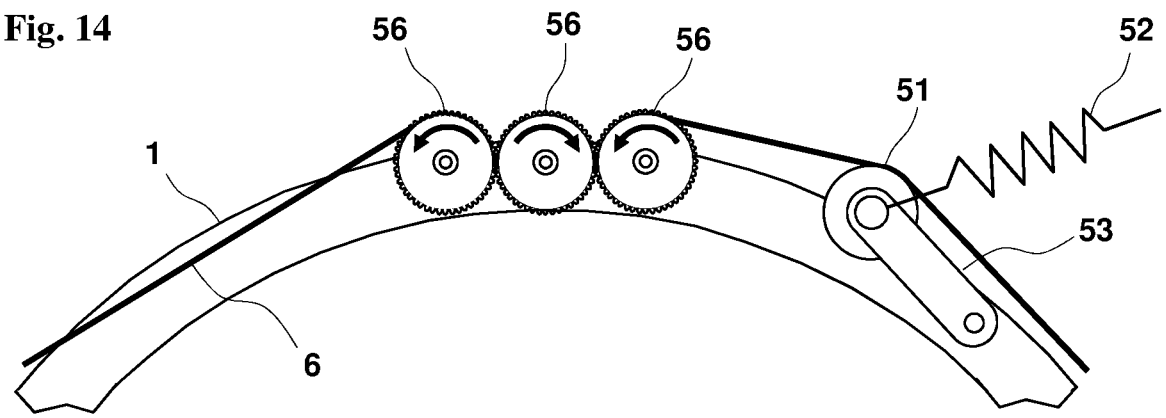
FIG. 14 represents multiple drive rollers with three gears driving the endless belt of FIG. 11.

Referring now to FIG. 14 there is shown a detail of the upper portion of the mechanical device described in FIG. 13 showing three spur gears (56) that may be connected axially to the idler rollers (55) and guide roller (54) shown in FIG. 13 and described above. It can be seen from the arrows that only one of the spur gears (56) may need to be driven while the other two may take the appropriate rotation to assist in the drive of the endless belt (6).

Figure 15:
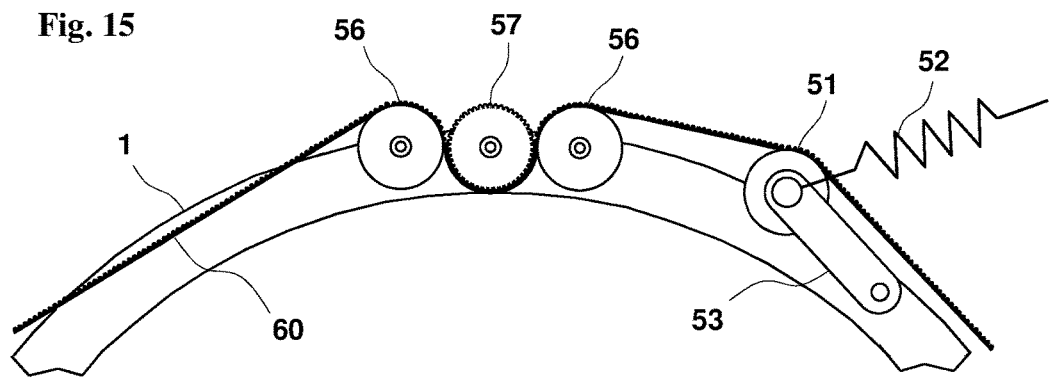
FIG. 15 represents an endless toothed belt being driven by one drive roller.

Referring now to FIG. 15, in another exemplary embodiment, there is shown a detail of the upper portion of the mechanical flipping device described in FIG. 13 showing a toothed endless belt (60) that may pass around the idler rollers (56), a tensioner roller (51) and may be engaged around a toothed drive pulley (57). In this configuration the pair of idler rollers (56) may provide additional contact distance and contact pressure between the toothed endless belt (60) and the toothed drive pulley (57).

Figure 16:
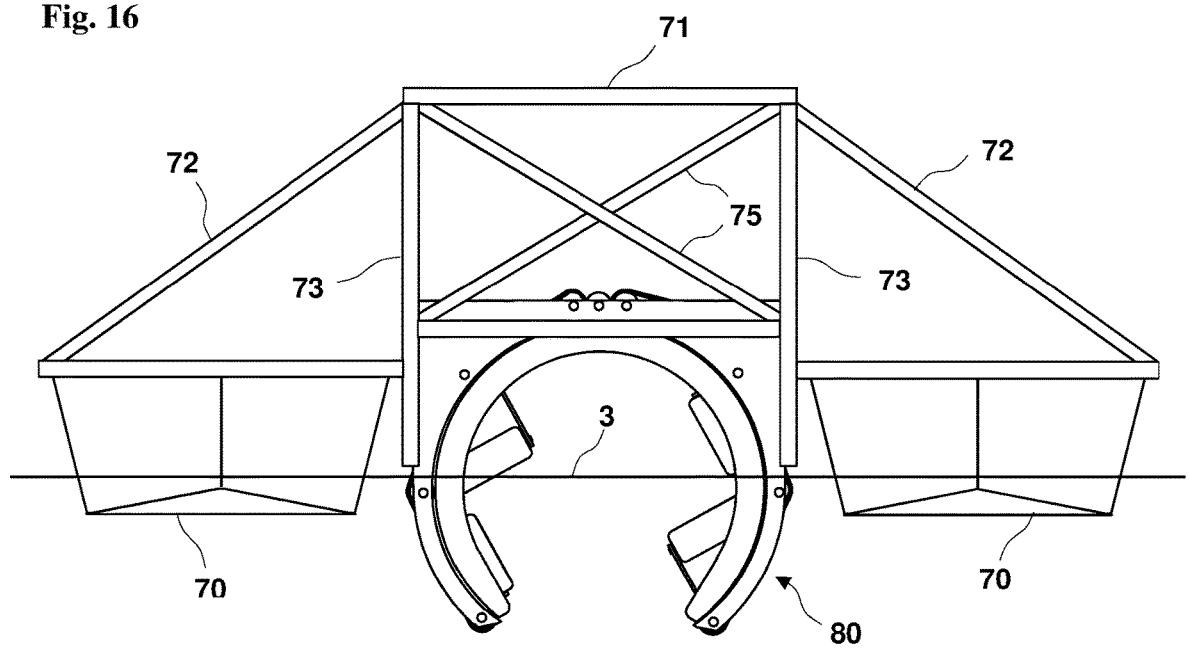
FIG. 16 represents a mechanical flipping device of any of the exemplary embodiments supported between two boats.

Referring now to FIG. 16 there is shown the mechanical flipping device (80) described in FIG. 3 and detailed in FIG. 15 positioned between two boats (70) that may be interconnected by a framework (71). The framework (71) may be attached to the boats (70) by vertical posts (73) and braces (72) to form a twin-hulled catamaran with a gap between the hulls sufficient to accommodate the mechanical flipping device (80) and position it at the correct height relative to the surface of the water (3). The framework (71) may further be reinforced by diagonal supports (75). Any of the exemplary embodiments previously described may be used with the framework (71) and boats (70) shown in FIG. 16.

Figure 17:
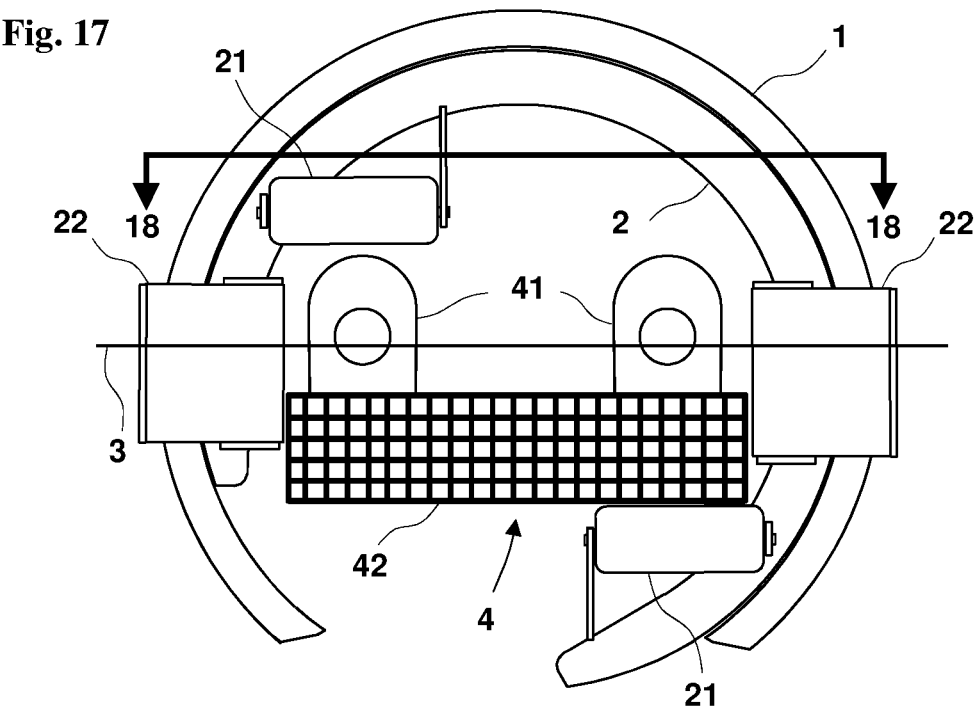
FIG. 17 represents another exemplary embodiment of a mechanical flipping device designed to capture a floating oyster cage and having guides to guide the oyster cage into the mechanical flipping device.

Referring now to FIG. 17 there is shown an exemplary embodiment of the mechanical flipping device with the rotating ring (2) oriented to capture an oyster cage (4) floating largely below the surface of the water (3) in preparation for the flipping operation. Rollers (21) are in a position to begin rotating the oyster cage (4) while guides (22) are in a position to guide the oyster cage (4) into the opening of the mechanical flipping device.

Figure 18:
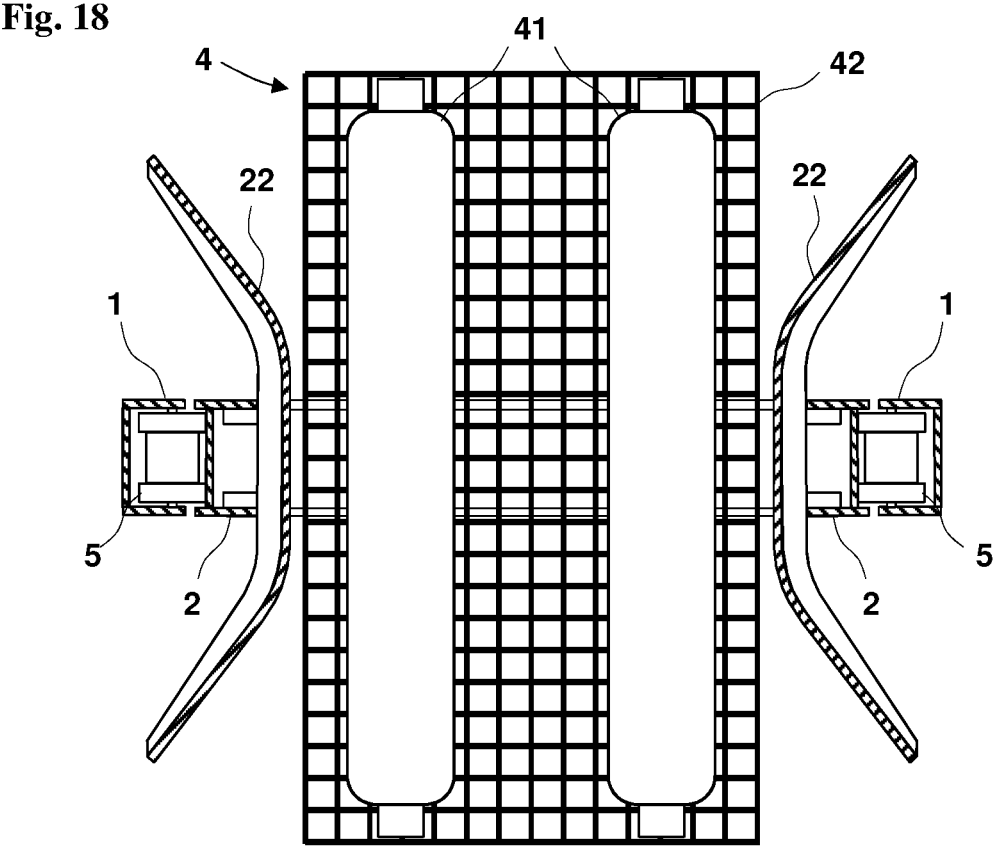
FIG. 18 is a sectional plan view of the mechanical flipping device of FIG. 17 showing in more detail the guide to guide the oyster cage into the mechanical flipping device.

Referring now to FIG. 18 guides (22) are better revealed in a partial cross-sectional plan view taken along the line 18-18 in FIG. 17 whereby their shape is shown. These guides (22) flare outwardly so that if the oyster cage (4) is not aligned perfectly with the rotating ring (2), the guides (22) will guide the oyster cage (4) into the center of the rotating ring (2). These guides (22) may be attached to rotating ring (2) and aid in supporting oyster cage (4) during the flipping process.

Referring now to FIG. 19 there is shown the mechanical flipping device (80) previously described positioned beside a boat (70) that supports the mechanical flipping device (80) while in use. The mechanical flipping device (80) may be attached to the bulwark of the boat (70) with a hinge (79) that allows the mechanical flipping device (80) to pivot out of the water and above the waterline (3) to allow the boat (70) to more easily transit through the water. Pivot post (76) and support wires (77 and 78) are shown that together provide the necessary support for the mechanical flipping device (80) and its positioning in and out of the water. Any of the exemplary embodiments previously described may be used with the hinge (79), pivot post (76), support wires (77 and 78) and boats (70) shown in FIG. 19.

It will be apparent to those skilled in the art having regard to this disclosure that other modifications of this invention beyond those embodiments specifically described here may be made without departing from the spirit of the invention. Accordingly, such modifications are considered within the scope of the invention. For example, if both fixed and rotating rings were full, continuous circles without gaps, then the support and rotation would be much simpler by various rotary-drive methods. In doing so, the anchor line at one end of the oyster cage array may need to be disconnected and manually passed through the center of the rings. The exemplary embodiments, in addition, may be supported alongside a single boat or may be mounted on a dock or pier and the line of oyster cages may be towed through it for each oyster cage to be flipped and then returned to their respective anchorage.

What is claimed is:

1. An apparatus for flipping a floating oyster cage comprising:
   a fixed ring;
   a rotatable ring rotatable concentric with the fixed ring;
   a means of rotating the rotatable ring relative to and concentric with the fixed ring; and
   a plurality of supports fixed on an interior surface of the rotatable ring such that one support extends at a first angle to the interior surface and a second support extends at the same first angle to the interior surface and the one support is spaced 180 degrees from the second support along a circumference of the rotatable ring on the interior surface, the plurality of supports receive and support the floating oyster cage in a first position;
   wherein, in operation, the rotatable ring rotating with respect to the fixed ring to cause the supported floating oyster cage to rotate to an inverted position from the first position as the rotating ring rotates.

2. The apparatus of claim 1 wherein the fixed ring and the rotatable ring each have a gap in their circumference such that the floating oyster cage is received within the gap of each of the fixed ring and the rotatable ring.

3. The apparatus of claim 1 wherein the plurality of supports includes a third support and a fourth support each of which extends at a second angle to the interior surface such that the third support is spaced 180 degrees from the fourth support along a circumference of the rotatable ring on the interior surface, the third support is positioned at a 90 degree angle with respect to the first support and the fourth support is positioned at a 90 degree angle with respect to the second support.

4. The apparatus of claim 3 wherein the third support and the fourth support comprise guides to guide the oyster cage within the rotatable ring.

5. The apparatus of claim 1 further comprising a plurality of guide rollers on the rotatable ring to support the rotatable ring within the fixed ring.

6. The apparatus of claim 1 wherein the means of rotating the rotatable ring comprising a motor.

7. The apparatus of claim 1 further comprising a plurality of guide rollers on the fixed ring to support the rotatable ring within the fixed ring.

8. The apparatus of claim 7 wherein the means of rotating the rotatable ring comprising a drive belt cooperating with the guide rollers to cause the rotatable ring to rotate.

9. The apparatus of claim 8 further comprising a tensioner roller to maintain tension in the drive belt.

10. The apparatus of claim 8 further comprising idler rollers to maintain tension in the drive belt.

11. The apparatus of claim 8 wherein the drive belt is a toothed drive belt and further comprising a toothed drive pulley mounted on the fixed ring to drive the toothed drive belt.

12. An apparatus for flipping a floating oyster cage comprising:
   a boat;
   a support structure mounted on the boat; and
   a mechanical flipping device attached to the support structure comprising:
      a fixed ring;
      a rotatable ring rotatable concentric with the fixed ring;

a means of rotating the rotatable ring relative to and concentric with the fixed ring; and a plurality of supports fixed on an interior surface of the rotatable ring such that one support extends at a first angle to the interior surface and a second support extends at the same first angle to the interior surface and the one support is spaced 180 degrees from the second support along a circumference of the rotatable ring on the interior surface, the plurality of supports receive and support the floating oyster cage in a first position;

wherein, in operation, the rotatable ring rotating with respect to the fixed ring to cause the supported floating oyster cage to rotate to an inverted position from the first position as the rotating ring rotates.

13. The apparatus of claim 12 wherein the fixed ring and the rotatable ring each have a gap in their circumference such that the floating oyster cage is received within the gap of each of the fixed ring and the rotatable ring.

14. The apparatus of claim 12 wherein the plurality of supports includes a third support and a fourth support each of which extends at a second angle to the interior surface such that the third support is spaced 180 degrees from the fourth support along a circumference of the rotatable ring on the interior surface, the third support is positioned at a 90 degree angle with respect to the first support and the fourth support is positioned at a 90 degree angle with respect to the second support.

15. The apparatus of claim 14 wherein the third support and the fourth support comprise guides to guide the oyster cage within the rotatable ring.

16. The apparatus of claim 12 further comprising a plurality of guide rollers on the rotatable ring to support the rotatable ring within the fixed ring.

17. The apparatus of claim 12 wherein the means of rotating the rotatable ring comprising a motor.

18. The apparatus of claim 12 further comprising a plurality of guide rollers on the fixed ring to support the rotatable ring within the fixed ring.

19. The apparatus of claim 18 wherein the means of rotating the rotatable ring comprising a drive belt cooperating with the guide rollers to cause the rotatable ring to rotate.

* * * * *